(12) United States Patent
Nakanishi

(10) Patent No.: US 6,450,459 B2
(45) Date of Patent: Sep. 17, 2002

(54) PIPE FASTENER

(75) Inventor: H. Nakanishi, Toyohashi (JP)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/768,966

(22) Filed: Jan. 24, 2001

(30) Foreign Application Priority Data

Feb. 1, 2000 (JP) ........................................ 2000-023629

(51) Int. Cl.$^7$ ................................................. F16L 3/22
(52) U.S. Cl. ........................... 248/68.1; 248/71; 174/51
(58) Field of Search ........................ 248/71, 74.1, 68.1, 248/73, 74.2; 174/51, 52.1, 54

(56) References Cited

U.S. PATENT DOCUMENTS

| 2,227,528 A | * | 1/1941 | Adler |
| 3,902,002 A | * | 8/1975 | Smith |
| 4,705,244 A | * | 11/1987 | Saotome et al. |
| 5,184,794 A | * | 2/1993 | Saito |
| 5,805,429 A | * | 9/1998 | Andersson |
| 6,036,145 A | * | 3/2000 | Calabrese et al. |
| 6,152,406 A | * | 11/2000 | Denndou |
| 6,206,330 B1 | * | 3/2001 | Oi et al. |
| 6,265,658 B1 | * | 7/2001 | Silvers |
| 6,290,201 B1 | * | 9/2001 | Kanie et al. |
| 6,311,934 B1 | * | 11/2001 | Fujii et al. |

* cited by examiner

Primary Examiner—Morie Chan
(74) Attorney, Agent, or Firm—Edward D. Murphy

(57) ABSTRACT

A pipe fastener 1 for fastening a pipe such as a fuel pipe 21 to a body panel 5 comprises a pipe holder 2 of rigid plastic material and an electrical connection member 3 of electrical conducting material. The pipe holder includes a base 9 having a stud receiving hole formed therein and a pipe grip (11–15) integrally molded with the base for holding the pipe (19–23) by pressing the pipe into an opening thereof, and the stud receiving hole of the base 9 has an engagement pawl formed therein for engaging with a received stud to be secured therein. The electrical connection member 3 is adapted to be attached to the pipe holder by an engagement leg 25 formed on said pipe holder 2. The electrical connection member 3 includes a pipe contact portion 29 and a stud contact portion 30. Under a condition where the electrical connection member 3 is attached to the pipe holder 2 by the engagement leg 25, the pipe contact portion 29 of the electrical connection member 3 extends toward the pipe grip 13 to come into contact with the pipe 21 held in the pipe grip and the stud contact portion 30 of the electrical connection member 3 comes into contact with the stud received in the stud receiving hole, so that the pipe 21 in contact with said pipe contact portion 29 is electrically connected to the body panel 5 via the stud 6.

3 Claims, 4 Drawing Sheets

PIPE FASTENER

BACKGROUND OF THE INVENTION

The present invention relates to a pipe fastener for securing pipes used to supply fuel, brake oil or the like in an automobile, to a body panel such as a body of the automobile.

Several pipe fasteners made of plastic material have been developed for fastening a pipe such as a fuel pipe to a body panel of an automobile (see, for example, Japanese Utility Model Laid-open No. 07-022189) contributing to cost saving. Further, as to a fuel pipe and a brake pipe, replacing a rubber pipe with a nylon pipe has reduced cost. The pipe made of nylon, however, has caused a disadvantage that a pipe is electrically charged by a friction between the fuel and the pipe during supplying the fuel, and thereby the spark is generated on an outer surface of the pipe to eventually produce pinholes in a coating on the pipe surface, or thereby the charged pipe and the fuel repel each other to prevent a smooth supply of the fuel.

In order to solve the problem caused by the above charging of the fuel pipe or the like, Japanese Utility Model Laid-open No. 04-058683 has suggested using a support member made of electrical conducting resin to support the pipe to discharge the electric charge on the pipe to a body panel. However, this support member must be made of such flexible material as polypropylene containing the electrical conducting material mixed therein so as to be conductive as a whole. Accordingly, the flexibility of the support member disadvantageously makes it difficult to increase an ability to hold the pipe. For example, in case of the pipe fastener illustrated in FIG. 3 of Japanese Utility Model Laid-open No. 04-058683 mentioned above, the pipe tends to be detached from the fastener under the bumpy condition in an automobile, and it requires a complicated mounting operation, such as entirely surrounding the pipe, as shown in FIGS. 1 and 2 thereof.

In case of the pipe fastener illustrated in Japanese Utility Model Laid-open No. 07-022189 mentioned above, it is molded from tough (or rigid) and flexible plastic material such as polyacetal to provide a great holding force and it also exhibits good operation efficiency since a simple operation of only pressing a pipe into a grip could secure the pipe.

Therefore, what had to be done was to make tough (rigid) but also flexible plastic material such as polyacetal be conductive, but since polyacetal resin added with electrical conducting material turned to be too rigid and brittle, desired holding force could not be obtained.

Accordingly, an object of the present invention is to provide a pipe fastener which allows a pipe to be mounted to a body panel by an easy operation and also provides sufficient holding force, while electric charge on a charged pipe can be discharged to the body panel.

SUMMARY OF THE PRESENT INVENTION

The object of the present invention mentioned above has been achieved by a pipe fastener for fastening a pipe such as a fuel pipe to a body panel of a vehicle by engaging with a stud fixedly connected to the body panel, comprising: a pipe holder of rigid plastic material including a base having a stud receiving hole formed therein and a pipe grip integrally molded with the base for holding the pipe by pressing the pipe into an opening of the grip, the stud receiving hole having an engagement pawl formed therein for engagement with a received stud to be secured; and an electrical connection member of electrical conducting material adapted to be attached to the pipe holder by an engagement means formed in the pipe holder; and wherein the electrical connecting member includes a pipe contact portion extending to the pipe grip into contact with the pipe held in the pipe grip when the electrical connection member is attached to the pipe holder by the engagement means; and a stud contact portion adapted to contact with the stud received in the stud receiving hole, so that the pipe in contact with the pipe contact portion is electrically connected to the body panel through the stud. Accordingly, there is provided the pipe fastener which is made of material having sufficient strength and provides an easy mounting operation and sufficient holding force, while allowing the electric charges which are accumulated on the pipe, to be discharged to the body panel through the electrical connection member, thus to solve the problem accompanied with the accumulated electric charges on the pipe.

In the above pipe fastener, the pipe contact portion of the electrical connection member may be made to have a pipe receiving surface extending from the surface opposite to the opening side of the pipe grip to the opening of the pipe grip, and the stud contact portion of the electrical connection member may be made to have a stud engagement hole adapted to be aligned to engage with the side of the stud which projects from the stud receiving hole. The engagement means can be an engagement leg standing on a surface opposite to the opening of the pipe grip, and the electrical connection member may be provided with an engagement hole to receive the engagement leg into engagement therewith, so that the electrical connection member is attached to the pipe holder by aligning the engagement hole of the electrical engagement member with the engagement leg and pressing the member to the leg. Further, the pipe holder may be made of tough and flexible resin such as polyacetal, and the electrical connection member is made of resin such as electrical conducting material mixed polyacetal resin. The pipe contacting the pipe contact portion may be a fuel pipe. The electrical connection member may be removably attached to the pipe holder.

Further, the present invention provides an alternative pipe fastener for fastening a pipe such as a fuel pipe to a body panel, comprising: a pipe holder of rigid plastic material including a base to be secured to the body panel and a pipe grip integrally molded with the base for holding the pipe by pressing the pipe into an opening of the grip; and an electrical connection member of electrical conducting material adapted to be attached to the pipe holder by an engagement means formed in the pipe holder; and wherein the electrical connecting member includes a pipe contact portion extending to the pipe grip into contact with the pipe held in the pipe grip when the electrical connection member is attached to the pipe holder by the engagement means; and a body panel contact portion extending from the pipe holder fixed to the body panel to a direct contact position where the body panel contact portion comes in direct contact with the body panel, so that the pipe in contact with the pipe contact portion is directly electrically connected to the body panel. Accordingly, there is also provided the pipe fastener which is made of material having sufficient strength and provides an easy mounting operation and sufficient holding force, while allowing the electric charges which are accumulated on the pipe, to be discharged to the body panel through the electrical connection member, thus to solve the problem accompanied with the accumulated electric charges. In this embodiment, the body panel contact portion may be made to have a brim portion adapted to be clamped between said body panel and said base secured to said body panel.

According to the present invention, a pipe holder can be made of material having sufficient strength so as to allow easy mounting operation and to provide sufficient holding force, while electric charges accumulated on a pipe can be discharged to a body panel by an electrical connection means, so that a problem accompanied by the charges to be accumulated on the pipe can be dissolved, and further, the pipe can be attached to the body panel with easy mounting operation while keeping a sufficient holding force.

BRIEF DESCRIPTION OF THE ACCOMPANYING DRAWINGS

DETAILED DESCRIPTION OF THE PREFERRED EMBODIMENTS

Figure 1:
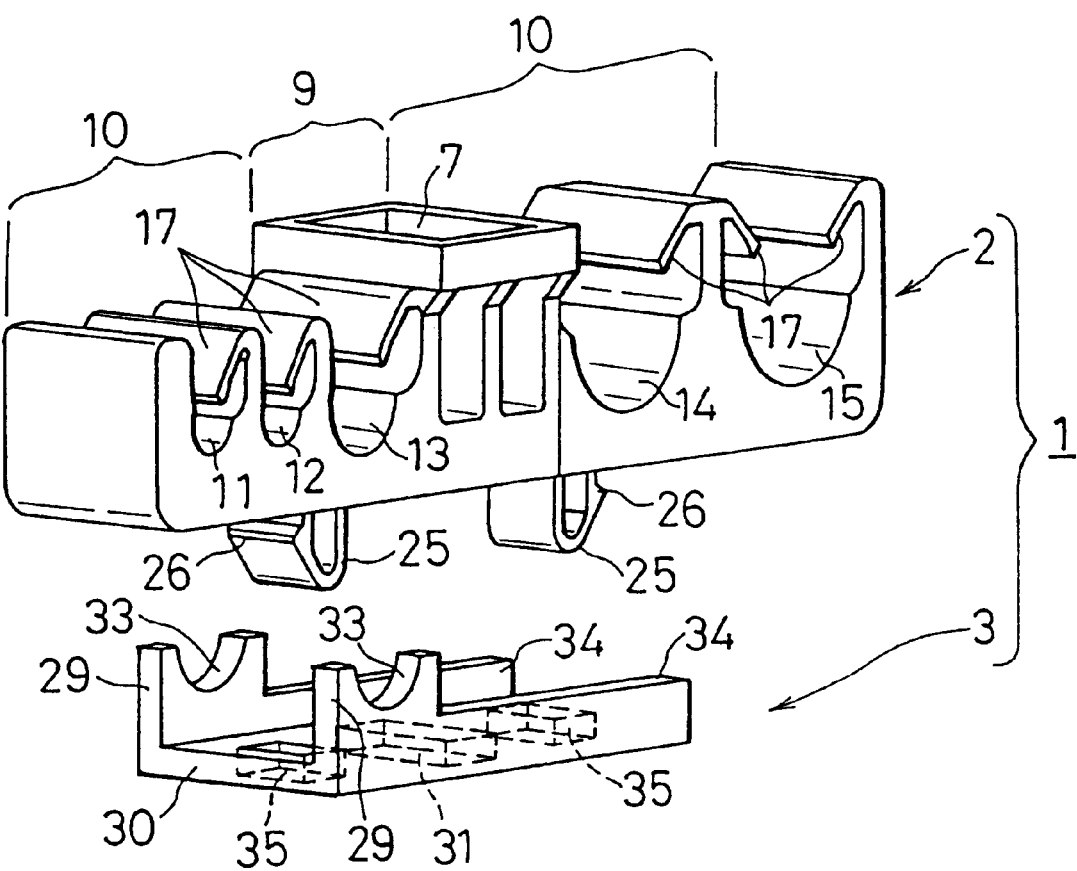
FIG. 1 is a perspective view of a pipe fastener according to the first embodiment of the present invention, illustrating a condition prior to being assembled.

Preferred embodiments of the present invention will be described with reference to the attached drawings. FIGS. 1 to 4 show a pipe fastener 1 according to a first embodiment of the present invention. As shown in FIG. 1, a pipe fastener 1 comprises a pipe holder 2 and an electrical connection member 3. The pipe holder 2 is made of, for example, integrally molded single-piece of rigid plastic material such as polyacetal to obtain sufficient strength for holding a pipe. The electrical connection member 3 is made of electrical conducting material. The electrical connection member 3 may be made of any material so far as it is conductive as a whole, including rigid material such as conducting metal, flexible material such as conducting rubber, and even somehow brittle material such as polyacetal resin mixed with electrical conducting material. The electrical connection member 3 is assembled with the pipe holder to make the pipe fastener 1.

Figure 2:
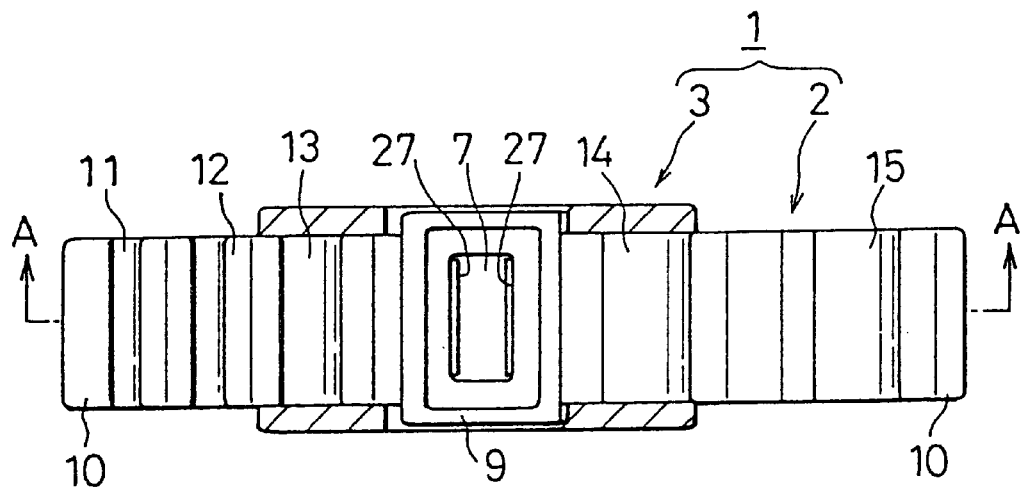
FIG. 2 is a plan view of the pipe fastener shown in FIG. 1 after being assembled.
Figure 3:
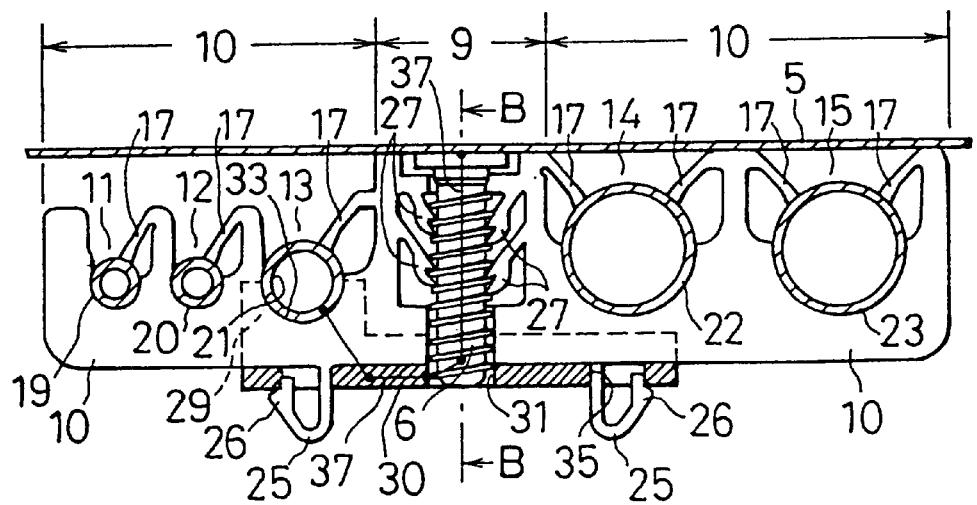
FIG. 3 is a cross-sectional view taken on line A—A of FIG. 2, illustrating by adding a body panel and a stud bolt.

In FIGS. 1 to 4, the pipe holder 2 of the pipe fastener 1 comprises a base 9 having a stud receiving hole 7 formed therein for receiving a stud 6 fixedly connected to a body panel 5, and a pipe gripping portion 10 integrally molded with the base 9 extending therefrom in the lateral direction for holding pipes by pressing the pipes into opening portions formed thereon. In this embodiment, the pipe gripping portion 10 is formed on each of the left and right sides of the base 9 for holding many pipes. The pipe gripping portion 10 has desired number of pipe grips 11–15 on demand, each of which is formed in a U-shaped groove with its top portion opening upward. The number of the pipe grips can be chosen arbitrarily corresponding to a design of piping arrangement, and the size of each pipe grip is also chosen arbitrarily to match the pipe size required by the design of piping arrangement. Each pipe grip has a resilient wing 17 formed therein extending diagonally from an upper end of the pipe grip toward the bottom surface of the groove to prevent the pipes 19–23 pressed thereinto from being detached therefrom. For a thick pipe such as pipe 22 or 23, two resilient wings may be arranged for each pipe grip 14 or 15. Further, each pipe gripping portion 10 has an engagement leg 25 as an engagement means, vertically arranged on a surface in an opposite side to the opening portion of the respective pipe grips to securely engage with the electrical connection member 3. Two engagement legs 25 are preferably arranged, as illustrated, to ensure that the electrical connection member 3 is coupled with the pipe holder. However, one or more than two engagement legs 25 may be provided so far as such coupling is ensured. The tip of the respective engagement leg is provided with a resilient pawl 26 for easy attachment of the electrical connection member 3 and for higher coupling force after the attachment. The resilient pawl 26, as shown in FIG. 3, is designed to be pressed by a finger or the like to be disengaged from the electrical connection member. That is, the electrical connection member is detachably attached to the pipe holder. Accordingly, if no pipe needs grounding, the electrical connection member 3 can be detached from the pipe fastener 1, leaving the pipe holder 2 to be solely used.

The stud receiving hole 7 of the base 9 is formed as an elongated hole parallel to a longitudinal direction (the vertical direction in FIG. 2) of the pipe held in the pipe gripping portion 10 to absorb a space or pitch error between a plurality of studs standing on the body panel 5. The stud receiving hole 7 has two pairs of engagement pawls 27 formed therein for engaging with a thread portion of the received stud. Each engagement pawl 27 is composed of a plate-like piece extending in parallel with the longitudinal direction of the stud receiving hole 7, and the plate-like pieces are located opposite to each other in a pair placing the stud receiving space therebetween. Each one of the engagement pawls 27 is located to be staggered along a height direction (the vertical direction in FIG. 3) so as to meet with a thread pitch of the stud 6. Further, the each engagement pawl 27 may preferably be formed in crotch shape, as illustrated, to increase an area to engage with the stud.

The electrical connection member 3 will now be described in detail with reference to FIGS. 1 to 4. As shown in FIG. 1, the electrical connection member 3 is coupled with and held by the pipe holder 2 using the engagement leg 25 located on a bottom surface (the under surface in FIG. 1) of the pipe holder 2 to be, in its coupled configuration, formed into the pipe fastener 1. The electrical connection member 3, as held by the pipe holder 2, comprises pipe contact portions 29 which extend toward the pipe grip 13 or the like to comes into contact with a pipe 21 held in the pipe grip 13, and a stud contact portion 30 which comes into contact with the stud 6 in the stud receiving hole 7. The stud contact portion 30 is made as a plate to be a base of the electrical connection member 3 and has a stud engagement hole 31 formed in a center thereof through which the stud penetrates while keeping contact therewith. The stud engagement hole 31 is formed to be an elongated hole so as to meet with the elongated hole of the stud receiving hole 7 to absorb the pitch error between a plurality of studs. Two inner walls facing opposite to each other in the longer edge sides of the stud engagement hole 31 are the stud contact walls to firmly engage with the stud. On this purpose, a distance between two inner walls is made to be equal to or smaller than an outer diameter of the stud, so that when the stud passes through the stud engagement hole 31, the thread portion of the stud makes inroad into the inner walls of the longer edge sides of the stud engagement hole 31 to ensure that the stud contact portion 30 is brought into contact with the stud 6.

Figure 4:
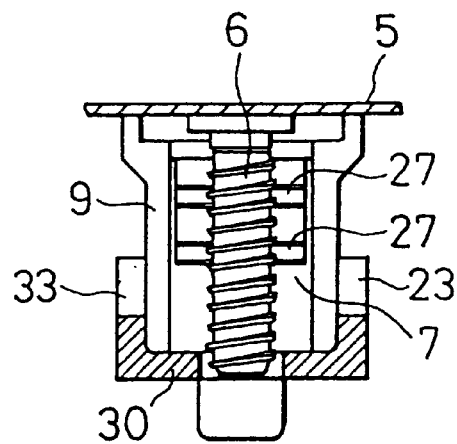
FIG. 4 is a cross-sectional view taken on line B—B of FIG. 3.

The pipe contact portions 29 extend along the pipe holder 2 from the opposite surface to the opening of the pipe grip (e.g. pipe grip 13) or the bottom surface toward the opening portion of the pipe grip of the pipe holder 2. More specifically, each of the pipe contact portion 29 is formed so as to be raised from a side edge of the plate-like stud contact portion 30 toward the pipe grip (e.g. pipe grip 13) and its upper portion is formed to be a pipe receiving surface 33 in a circular concave shape to receive and contact the outer surface of the fuel pipe 21 held in the pipe grip 13. The pipe contact portion 29, as illustrated, is preferably formed on both edge portions located in the opposite sides of the stud contact portion 30 respectively so as to make the contacting area larger as well as to increase the strength of the stud contact portion and eventually to increase the strength of the electrical connection member 3. To enhance the strength to be much greater, an upright wall portion 34 having a height lower than that of the pipe contact portion 29 is preferably formed continuous with each pipe contacting portion 29 on each edge portion of the stud contact portion 30. Further, the distance between the pair of pipe contact portions 29 and the upright walls 34 (i.e. a width of the stud contact portion 30) is preferably equal to or slightly wider than a width of the bottom surface of the pipe holder 2. Therefore, the pipe contact portion 29 and the upright wall 34 can be formed as a guide upon combining the electrical connection member 3 with the pipe holder 2, which facilitate the assembling operation. Bringing the distance between the pair of pipe contact portions 29 and the upright walls 34 closer to the width of the bottom surface of the pipe holder makes the assembling to be more stable without looseness or clattering. The stud contact portion 30, which is the base of the electrical connection member 3, is provided with an engagement hole 35 for receiving the engagement leg 25 of the pipe holder 2 to engage with the resilient pawl 26. A shape, location, and number of the engagement hole 35 are respectively determined to suit the engagement leg 25 of the pipe holder 2. Each engagement hole 35 has an edge portion with which the resilient pawl 26 engages after each engagement leg 25 is completely inserted through the corresponding engagement hole 35 (see FIG. 3), so that the electrical connection member 3 is easily but also securely coupled to the bottom surface of the pipe holder 2 to be formed into the pipe fastener 1. FIGS. 2 to 4 show the pipe fastener 1 in its coupled condition. Under such coupled condition, the pipe fastener 1 can be for sales or for delivering to users to be used.

Since the pipe holder 2 has sufficient pipe holding force, the electrical connection member 3 may be made of any desired electrical conducting material. The electrical connection member may be made of, for example, less rigid material such as conducting rubber, polypropylene mixed with electrical conducting material or the like, or contrarily more rigid conducting metal, or further, brittle material such as polyacetal mixed with electrical conducting material. It should be noted that in the above embodiment, the pipe 21 with which the receiving surface 33 of the pipe contact portion 29 comes into contact is a fuel pipe. However, it is a matter of course that the pipe contact portion 29 may be designed to come into contact with a pipe other than a fuel pipe, for example, brake oil pipe or the like. Further, although only one pipe is in contact therewith in the illustrated embodiment, the number of pipes in contacting therewith may be two or more in accordance with the number of the pipes which need grounding. The number of the pipe contact sections 29 and the shape of the pipe receiving surface 33 may also be arbitrarily defined corresponding to the number and the shape of the pipes to be contacted.

FIG. 3 shows the pipes 19–23 mounted to the body panel 5 using the pipe fastener 1 configured as described above. The pipe holder 1 is located in a predetermined position in relation to the pipes 19–23, and then the pipes 19–23 are pressed into the corresponding pipe grips 12–15 of the pipe gripping portion 10 respectively so as to be held therein. Generally, a plurality of pipe holders 1 are attached to the pipe(s) with predetermined positions and intervals therebetween, and then, the pipe(s) having the pipe holders assembled thereto are supplied to the body panel 5 on which a plurality of studs are fixed with predetermined positions and intervals thereon, and then, each pipe holder 1 is pressed to the stud 6 so as to receive into the corresponding stud receiving hole 7. Through this pressing, the engagement pawl 27 engages with the stud bolt 6 and the pipe holder 1 is mounted to the body panel 5, and thus the pipes 19–23 are fastened to the body panel 5. Upon this pressing, the electrical connection member 3 is, on its pipe receiving surface 33 of the pipe contact portion 29, brought into contact with the outer surface of the pipe 21 to establish electrical connection therebetween. Further, the inner wall of the stud engagement hole 31 of the stud contact portion 30 also comes into contact with the thread of the stud 6 to bring the electrical connection member 3 into electrically connected to the stud 6. Since the electrical connection member 3 is conductive, the pipe 21 which is in contact with the pipe contact portion 29 is electrically connected to the body panel 5 via the stud 6. Thus, for example, even if the fuel pipe 21 is charged during feeding the fuel, the electric charges on the pipe can be discharged through the electrical connection member 3 and the stud 6 to the body panel 5 to prevent the electric charges from being accumulated on the pipe 21. In FIG. 3, a bold solid line 37 represents the electrical connection line. That is, the electrical connection member 3 works to ground the pipe to the body panel. It should be noted that since a function of holding a pipe relies on the pipe holder 2, the electrical member 3 should not necessarily be rigid, but of course, could be rigid.

Figure 5:
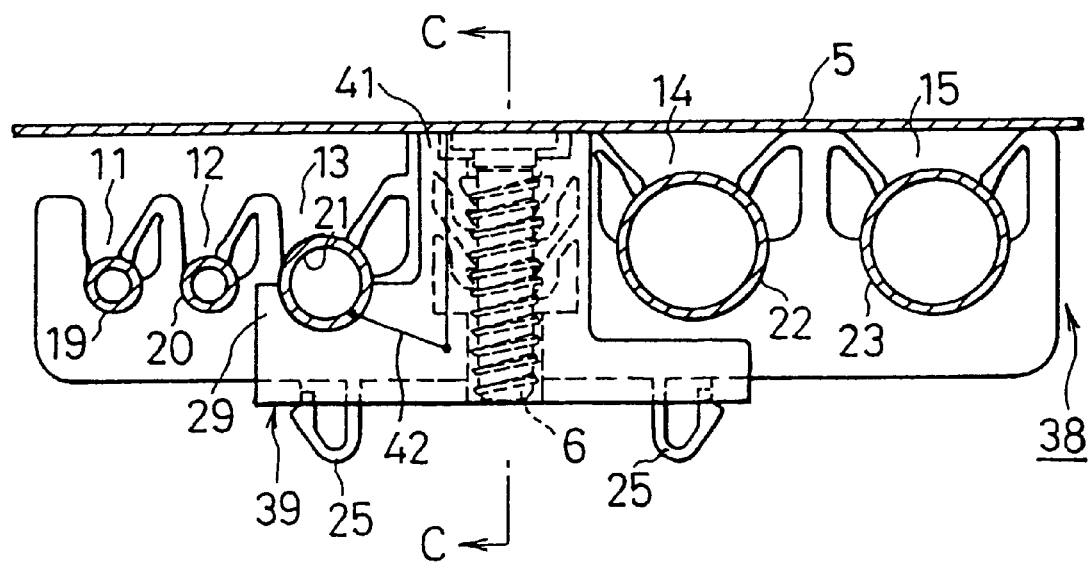
FIG. 5 is a cross-sectional view similar to FIG. 3, illustrating a pipe fastener according to the second embodiment of the present invention.
Figure 6:
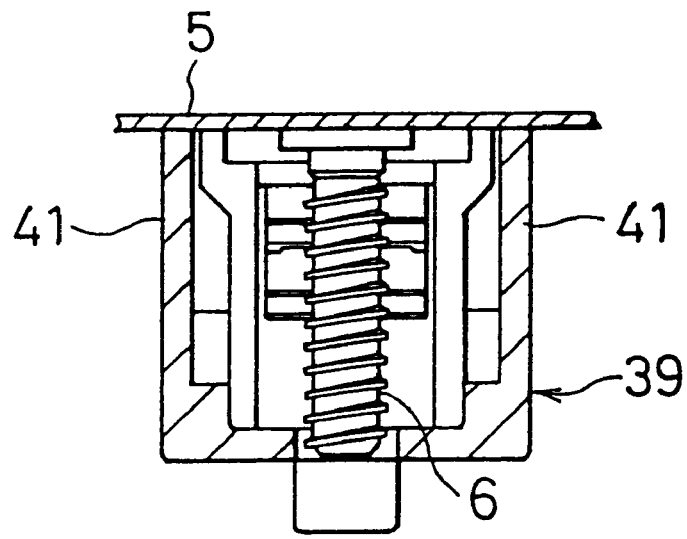
FIG. 6 is a cross-sectional view taken on line C—C of FIG. 5.

FIGS. 5 and 6 show a pipe fastener 38 according to a second embodiment of the present invention. In this embodiment, an electrical connection member 39 does not have a stud contact portion but has a body panel contact portion 41 extending to a position where it comes into direct contact with the body panel. Since the rest of parts of the pipe fastener 38 are similar to those of the pipe fastener 1 according to the first embodiment shown in FIGS. 1 to 4, the detailed description will be omitted. The body panel contact portion 41 has a body panel contact surface formed in an upper portion thereof, and pressing the pipe fastener 1 toward a body panel 5 brings the body panel contact portion 41 into contact with the body panel 5 to establish the electrical connection between the electrical connection member 39 and the body panel 5. On the other hand, a pipe 21 held in a pipe grip 13 is in contact with the pipe contact portions 29. Therefore, the electrical connection member 39 is electrically connected to the pipe 21. Accordingly, the electrical connection member 39 (thus the pipe fastener 38), because of its holding the pipe 21 therein, can electrically connect the pipe 21 directly to the body panel and discharge the electric charges on the pipe 21 to the body panel 5. The electrical connection line thereof is indicated by a bold solid line 42 in FIG. 5. It should be noted that, in this embodiment, since the pipe can be grounded to the body panel without passing through the stud 6, the pipe fastener 1 may be of such type that could be mounted to the body panel without using stud. For example, the pipe fastener 1 may be formed to have a anchor type engagement pawl which is inserted into a mounting hole of the body panel to be securely coupled to the body panel, or the pipe fastener 1 may be fixedly connected to the body panel by any means, for example, using bolt and nut, adhesives or the like.

Figure 7:
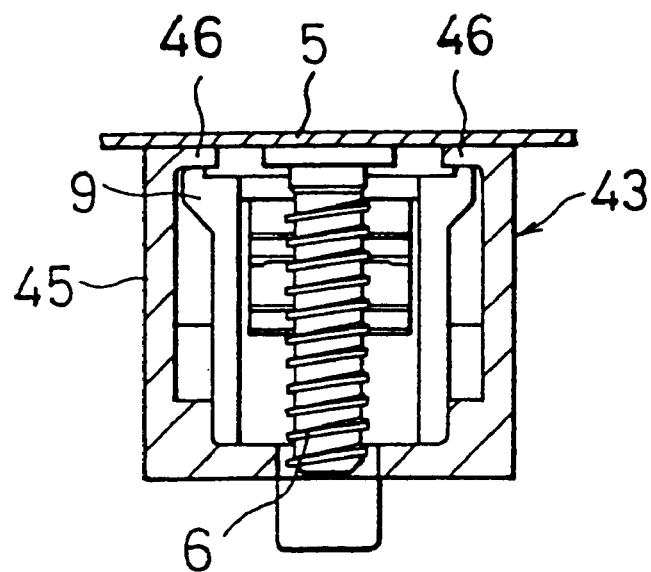
FIG. 7 is a cross-sectional view similar to FIG. 6, illustrating a pipe fastener according to the third embodiment of the present invention.

FIG. 7 shows a pipe fastener 43 according to a third embodiment of the present invention. The pipe fastener 43 is almost same as the pipe fastener 38 according to the second embodiment, excepting that a body panel contact portion 45 of its electrical connection member additionally has a brim portion 46 clamped between the body panel 5 and the base 9 of the pipe fastener secured onto the body panel 5. By providing the brim portion 46, the body panel contact portion 45 is in more securely contact with the body panel 5 with larger contacting area, and the electric resistance becomes much lower than that in the second embodiment which makes the electrical connection between the electrical connection member and the body panel, and therefore, the electrical connection can be more securely established therebetween.

In general, the above-identified embodiments are not to be construed as limiting the breadth of the present invention. It is understood that other modifications or other alternative constructions will be apparent which are within the scope of the invention as defined in the appended claims.

What is claimed is:

1. A pipe fastener connected to a stud fixedly connected to a body panel of an automobile for connecting a plurality of pipes thereto; the pipe fastener comprising:
  a. a pipe holder of rigid plastic material having a base with a stud receiving hole formed therein, and a plurality of integrally molded pipe grips therein adapted to receive one of the pipes in each of the pipe grips;
  b. a plurality of pipe engagement pawls formed in the pipe holder; one in each pipe grip to releasably clamp the pipe in the pipe grip;
  c. a plurality of stud engagement pawls formed in the stud receiving hole to secure the pipe holder to the stud;
  d. an electrical connection member releasably connected to the pipe holder in superposition to the stud receiving hole thereof and in direct contact with the stud;
  e. the electrical connection member formed of electrical conducting plastic material which is substantially softer than the plastic material of the pipe holder; and
  f. a pair of pipe contact portions formed on the electrical connection member disposed adjacent the pipe grip carrying a fuel pipe, and each of the pipe contact portions to engage the fuel pipe with sufficient force to establish electrical contact therewith whereby any electrical current developed in the fuel pipe will be conducted from the pipe contact portions, through the electrical connection member directly to the stud and body panel to ground said electric current.

2. The combination claimed in claim 1 wherein:
  a. a pair of engagement legs having resilient connection member pawls formed on the pipe holder to extend in a direction away from the body panel; and
  b. the electric connection member having a pair of engagement holes to releasably receive the resilient connection member pawls therein, so as to releasably clamp the electrical connection member to the pipe holder to force the pipe contact portions into electric contact with the fuel pipe.

3. The combination claimed in claim 2 wherein:
  a. the pipe holder to receive small pipes on one side thereof and larger pipes on the other side thereof;
  b. the fuel pipe is received on the small pipe side adjacent to the stud;
  c. one of the connection member pawls is disposed on one side of the stud, and the other of the connection member pawls is disposed on the other side of the stud; and
  d. each of the engagement holes of the electric connection member is formed in alignment to one of the connection member pawls to permit releasable engagement therebetween.

* * * * *